(12) United States Patent
Ergan et al.

(10) Patent No.: US 8,041,904 B2
(45) Date of Patent: Oct. 18, 2011

(54) NON-VOLATILE MEMORY CACHE PERFORMANCE IMPROVEMENT

(75) Inventors: Cenk Ergan, Bellevue, WA (US); Clark D. Nicholson, Seattle, WA (US); Dan Teodosiu, Bellevue, WA (US); Dean L. DeWhitt, Sammamish, WA (US); Emily Nicole Hill, Seattle, WA (US); Hanumantha R. Kodavalla, Bellevue, WA (US); Michael J. Zwilling, Redmond, WA (US); John M. Parchem, Shorline, WA (US); Michael R. Fortin, Redmond, WA (US); Nathan Steven Obr, Clyde Hill, WA (US); Rajeev Y. Nagar, Sammamish, WA (US); Surenda Verma, Bellevue, WA (US); Therron Powell, Redmond, WA (US); William J. Westerinen, Sammamish, WA (US); Mark Joseph Zbikowski, Woodinville, WA (US); Patrick L. Stemen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 75 days.

(21) Appl. No.: 12/627,710

(22) Filed: Nov. 30, 2009

(65) Prior Publication Data
US 2010/0077197 A1    Mar. 25, 2010

Related U.S. Application Data

(62) Division of application No. 10/837,986, filed on May 3, 2004, now Pat. No. 7,644,239.

(51) Int. Cl.
*G06F 12/02* (2006.01)

(52) U.S. Cl. ............ 711/154; 711/161; 711/162; 713/1; 714/6.1

(58) Field of Classification Search .................. 711/154, 711/161, 162; 714/6.1; 713/1
See application file for complete search history.

(56) References Cited

U.S. PATENT DOCUMENTS

| | | | |
|---|---|---|---|
| 4,945,474 A | 7/1990 | Elliott et al. | |
| 4,979,108 A | 12/1990 | Crabbe, Jr. | |
| 5,307,497 A | 4/1994 | Feigenbaum et al. | |
| 5,394,531 A | 2/1995 | Smith | |

(Continued)

FOREIGN PATENT DOCUMENTS

CN    1465009 A    12/2003

(Continued)

OTHER PUBLICATIONS

"Computervision Launches Design Automation Development Platform for Windows, UNIX Desktop Applications", PR Newswire, Financial News, Jan. 10, 1995, 3 pages.

(Continued)

*Primary Examiner* — Jae Yu
(74) *Attorney, Agent, or Firm* — Woodcock Washburn LLP

(57) ABSTRACT

In order to provide a more efficient persistent storage device, one or more long-term storage media are included along with a non-volatile memory. In one embodiment, one portion of the non-volatile memory is used as a write buffer and a read cache for writes and reads to the long-term storage media. Interfaces are provided for controlling the use of the non-volatile memory as a write buffer and a read cache. Additionally, a portion of the non-volatile memory is used to provide a direct mapping for specified sectors of the long-term storage media. Descriptive data regarding the persistent storage device is stored in another portion of the non-volatile memory.

23 Claims, 9 Drawing Sheets

U.S. PATENT DOCUMENTS

| | | | |
|---|---|---|---|
| 5,420,998 | A | 5/1995 | Horning |
| 5,652,857 | A | 7/1997 | Shimoi et al. |
| 5,720,029 | A | 2/1998 | Kern et al. |
| 5,740,434 | A | 4/1998 | Eastep |
| 5,754,782 | A | 5/1998 | Masada |
| 5,764,877 | A | 6/1998 | Lomet et al. |
| 5,806,074 | A | 9/1998 | Souder et al. |
| 5,897,638 | A | 4/1999 | Lasser et al. |
| 5,900,870 | A | 5/1999 | Malone et al. |
| 5,943,692 | A | 8/1999 | Marberg et al. |
| 6,018,433 | A | 1/2000 | Thayne et al. |
| 6,018,746 | A | 1/2000 | Hill et al. |
| 6,047,291 | A | 4/2000 | Anderson et al. |
| 6,073,232 | A | 6/2000 | Kroeker et al. |
| 6,098,075 | A | 8/2000 | Becraft, Jr. et al. |
| 6,101,601 | A | 8/2000 | Matthews et al. |
| 6,108,004 | A | 8/2000 | Medl |
| 6,112,024 | A | 8/2000 | Almond et al. |
| 6,199,195 | B1 | 3/2001 | Goodwin et al. |
| 6,209,088 | B1 | 3/2001 | Reneris |
| 6,240,414 | B1 | 5/2001 | Beizer et al. |
| 6,247,026 | B1 | 6/2001 | Waldo et al. |
| 6,314,433 | B1 | 11/2001 | Mills et al. |
| 6,321,234 | B1 | 11/2001 | Debrunner |
| 6,338,056 | B1 | 1/2002 | Dessloch et al. |
| 6,338,126 | B1 | 1/2002 | Ohran et al. |
| 6,360,330 | B1 | 3/2002 | Mutalik et al. |
| 6,370,534 | B1 | 4/2002 | Odom et al. |
| 6,370,541 | B1 | 4/2002 | Chou et al. |
| 6,401,093 | B1 | 6/2002 | Anand et al. |
| 6,438,750 | B1 | 8/2002 | Anderson |
| 6,454,159 | B1 | 9/2002 | Takushima |
| 6,477,564 | B1 | 11/2002 | Freyssinet et al. |
| 6,505,205 | B1 | 1/2003 | Kothuri et al. |
| 6,519,597 | B1 | 2/2003 | Cheng et al. |
| 6,539,456 | B2 | 3/2003 | Stewart |
| 6,542,904 | B2 | 4/2003 | Crus et al. |
| 6,556,983 | B1 | 4/2003 | Altschuler et al. |
| 6,578,046 | B2 | 6/2003 | Chang et al. |
| 6,640,278 | B1 | 10/2003 | Nolan et al. |
| 6,671,699 | B1 | 12/2003 | Black et al. |
| 6,671,757 | B1 | 12/2003 | Multer et al. |
| 6,684,229 | B1 | 1/2004 | Luong et al. |
| 6,694,336 | B1 | 2/2004 | Multer et al. |
| 6,714,935 | B1 | 3/2004 | Delo |
| 6,718,361 | B1 | 4/2004 | Basani et al. |
| 6,738,789 | B2 | 5/2004 | Multer et al. |
| 6,751,658 | B1 | 6/2004 | Haun et al. |
| 6,757,696 | B2 | 6/2004 | Multer et al. |
| 6,760,736 | B2 | 7/2004 | Waldo et al. |
| 6,772,178 | B2 | 8/2004 | Mandal et al. |
| 6,871,271 | B2 | 3/2005 | Ohran et al. |
| 7,017,037 | B2 | 3/2006 | Fortin et al. |
| 7,036,040 | B2 | 4/2006 | Nicholson et al. |
| 7,065,627 | B2* | 6/2006 | Dayan et al. ............. 711/173 |
| 7,082,495 | B2 | 7/2006 | DeWhitt et al. |
| 7,143,120 | B2 | 11/2006 | Oks et al. |
| 7,366,740 | B2 | 4/2008 | Sleeman et al. |
| 7,644,239 | B2 | 1/2010 | Ergan et al. |
| 2002/0004876 | A1 | 1/2002 | Timmer et al. |
| 2002/0091702 | A1 | 7/2002 | Mullins |
| 2002/0143521 | A1 | 10/2002 | Call |
| 2002/0152422 | A1 | 10/2002 | Sharma et al. |
| 2002/0171966 | A1 | 11/2002 | Ottesen et al. |
| 2002/0198891 | A1 | 12/2002 | Li et al. |
| 2003/0101320 | A1* | 5/2003 | Chauvel et al. ............. 711/154 |
| 2003/0154337 | A1 | 8/2003 | Ohno et al. |
| 2003/0158839 | A1 | 8/2003 | Faybishenko et al. |
| 2003/0177305 | A1 | 9/2003 | Hetrick |
| 2003/0191916 | A1* | 10/2003 | McBrearty et al. ........... 711/162 |
| 2003/0212660 | A1 | 11/2003 | Kerwin |
| 2003/0212857 | A1 | 11/2003 | Pacheco et al. |
| 2004/0003003 | A1 | 1/2004 | McCartney et al. |
| 2004/0003223 | A1 | 1/2004 | Fortin et al. |
| 2004/0015504 | A1 | 1/2004 | Ahad et al. |
| 2004/0024795 | A1 | 2/2004 | Hind et al. |
| 2004/0034765 | A1* | 2/2004 | James ........................ 713/1 |
| 2004/0044776 | A1 | 3/2004 | Larkin |
| 2004/0059747 | A1 | 3/2004 | Olarig et al. |
| 2004/0093463 | A1 | 5/2004 | Shang |
| 2004/0107200 | A1 | 6/2004 | Sjogren et al. |
| 2004/0174631 | A1 | 9/2004 | Tanaka et al. |
| 2005/0149750 | A1* | 7/2005 | Lisanke et al. ............. 713/200 |
| 2005/0172067 | A1* | 8/2005 | Sinclair ..................... 711/103 |
| 2005/0239494 | A1 | 10/2005 | Klassen et al. |
| 2005/0262378 | A1 | 11/2005 | Sleeman et al. |
| 2006/0106889 | A1 | 5/2006 | Mannby |
| 2007/0073764 | A1 | 3/2007 | Oks et al. |

FOREIGN PATENT DOCUMENTS

| | | |
|---|---|---|
| JP | 4-246746 A | 9/1992 |
| JP | 5-62329 A | 3/1993 |
| JP | 5-94353 A | 4/1993 |
| JP | 5-225066 A | 9/1993 |
| JP | 6-83708 A | 3/1994 |
| JP | 6-236351 A | 8/1994 |
| JP | 7-504527 A | 5/1995 |
| JP | 7-253935 A | 10/1995 |
| JP | 8-263380 A | 10/1996 |
| JP | 10-154101 A | 6/1998 |
| JP | 2001-27967 A | 1/2001 |
| JP | 2001-67258 A | 3/2001 |
| JP | 2001-250315 A | 9/2001 |
| WO | WO 93/18461 A1 | 9/1993 |
| WO | WO 01/11486 A2 | 2/2001 |
| WO | WO 01/75581 A1 | 10/2001 |
| WO | WO 02/01364 A2 | 1/2002 |

OTHER PUBLICATIONS

"Developer's Guide to Apple Data Detectors—For Version 1.0.2", Apple Computer, Inc., 1997, 1-34.

"Mechanical Design Software (Buyers Guide)", Computer-Aided Engineering, Dec. 1993, 12(12), 32-36.

"Oracle 9i SQL Reference", Release 2 (9.2), Oct. 2002, 29 pages.

Anderson et al., "Referential Integrity Implementation Details and Advantages", IBM Technical Disclosure Bulletin, Mar. 1, 1995, 38(3), 477-487.

Andrews et al., "Combining Language and Database Advances in an Object-Oriented Development Environment", Conference on Object Oriented Programming Systems Languages and Applications, Orlando, Florida, United States, Oct. 4-8, 1987, 430-440.

Ballard et al., "Improved Recovery From Partial Page Writes of Data Pages", IBM technical Disclosure Bulletin, May 1, 1993, 36(5), 141-143.

Beard et al., "Multilevel and Graphical Views of Metadata", Fifth International Forum on Research and Technology Advances in Digital Libraries, Santa Barbara, California, Apr. 22-24, 1998, 256-265.

Beitner et al., "Multimedia Support and Authoring in Microcosm: an extended model", Department of Electronics and Computer Science, University of Southampton, 1994, 12 pages.

Berg, "How Do I Create Persistent Java Objects?", Dr. Dobb's Journal, 1997, 22(4), 98-101.

Bhattacharya et al., "Coordinating Backup/Recovery and Data Consistency Between Database and File Systems", International Conference on Management of Data, Madison, Wisconsin, USA, Jun. 4-6, 2002, 12 pages.

Biliris, "The Performance of Three Database Storage Structures for Managing Large Objects", ACM SIGMOD, 1992, 21(2), 276-285.

Booch, "Object-Oriented Analysis and Design with Applications", Cummings Publishing Co., 1994, 155-156 and 179-183.

Bracchi et al., "Binary Logical Associations in Data Modelling", Modelling in Data Base Management Systems G.M. Nijssen, (ed), Proceeding of the IFIP Working Conference on Modelling in Data Base Management Systems, Freudenstadt, Germany, Jan. 5-8, 1976, 125-147.

Bullock et al., "Recovery of Data Pages after Partial Page Writes", IBM Technical Disclosure Bulletin, Aug. 1991, 34(3), 69-83.

Buneman et al., "Inheritance and Persistence in Database Programming Languages", International Conference on Management of Data, Washington, D.C., United States, 1986, 4-15.

Cammarata et al., "Extending a relational database with deferred referential integrity checking and intelligent joins", SIGMOD Record USA, Jun. 1989, 18(2), 88-97.

Chien, "Concurrent Aggregates (CA)—Design and Experience with a Concurrent Object—Oriented Language Based on Aggregates", Journal of Parallel and Distributed Computing, Mar. 1995, 25(2), 174-196.

Chryssostomidis et al., "Geometric Modeling Issues in Computer Aided Design of Marine Structures", Marine Technology Society Journal, Dec. 1988, 22(2), 15-33.

Ciccozzi, "Microsoft Press Computer Dictionary", 1997, 3, 39-40.

D'Andrea et al., "UniSQL's next-generation object-relational database management system", ACM SIGMOD Record, Sep. 1996, 25(3), 70-76.

Darby, "Object Serialization in Java 1.1. Making Objects Persistent", WEB Techniques, 1997, 2(9), 55 and 58-59.

Dietrich, Jr., et al., "TGMS: An Object-Oriented System for Programming Geometry", Software-Practice and Experience, Oct. 1989, 19(10), 979-1013.

Dobashi et al, "Skylight for Interior Lighting Design", Computer Graphics Forum, Aug. 1994, 13(3), 85-96.

Dorsch, "Accel Signs with IBM to Buy Altium PCB Unit", EDA Licensing, Electronic New, Jan. 16, 1995, 3 pages.

EP Application No. 05103690: Partial European Search Report, Apr. 28, 2008, 7 pages.

Fegaras et al., "Optimizing Object Queries Usingan Effective Calculus", ACM Transactions on Database Systems (TODS), Dec. 2000, 25(4), 457-516.

Findler et al., "Contract Soundness for Object-Oriented Languages", ACM Conference on Object-Oriented Programming Systems, Languages, and Applications (OOPSLA), Nov. 2001, 36(11), 15 pages.

Foley et al., "Computer Graphics: Principles and Practices", Second Edition, Addison-Wesley Publishing Company, 1990, Chapter 5 and 9, 201-283.

Friis-Christensen et al., "Requirements and Research issues in Geographic Data Modeling", Proceedings of the 9th ACM international symposium on Advances in geographic information systems, Atlanta, Georgia, USA, Nov. 9-10, 2001, 7 pages.

Fuh et al., "Implementation of SQL3 Structured Types with Inheritance and Value Substitutability", Digital Symposium Collection 2000 (Abstract only), 2000, 2 pages.

Garcia, "SQL Server 2000 Official Manual", Nikkei BP Soft Press, Mar. 19, 2001, 2(1) 247-298.

Garret, Jr., et al., "An Object Oriented Environment for Representing Building Design and Construction Data", Advanced Construction Technology Center, Document No. 89-37-04, Jun. 1989, 1-34.

Goscinski, "Distributed Operating Systems: The Logical Design", Addison-Wesley Longman Publishing Co., Inc., 1991, 306-313.

Harrison et al., "Structure Editors: User-Defined Type Values and Type Inference", International Conference on Software Methods and Tools, 2000, Wollongong, NSW, Australia, Nov. 6-9, 2000, 241-247.

Haverlock, "Object Serialization, Java, and C++", Dr. Dobb's Journal, Aug. 1, 1998, 23(8), 5 pages.

Hay, "Data Model Patterns: Convention of Thought", Dorset House Publishing, New York, NY, 1996, 47-67 and 235-259.

Hernandez et al, "The Merge/Purge Problem for Large Databases", International Conference on Management of Data and Symposium on Principles of Database Systems, Proceedings of the 1995 ACM SIGMOD International Conference on Management of Data, May 1995, 24(2), 12 pages.

Hsiao et al., "DLFM: A Transactional Resource Manager", International Conference on Management of Data, 2000, 518-528.

Kaneko et al., "Design of 3D CG Data Model of Move Animation Database System", Advanced Database Research and Development Series, Proceedings of the Second Far-East Workshop On Future Database Systems, 1992, 2, 364-372.

Kaneko et al., "Towards Dynamics Animation on Object-Oriented Animation Database System Move", Advanced Database Research and Development Series, Proceedings of the 3rd International Conference on Database Systems for Advanced Applications (DASFAA), 1993, 4, 3-10.

Katz, "Toward a Unified Framework for Version Modeling in Engineering Databases", ACM Computing Surveys (CSUR), Dec. 1990, 22(4), 375-408.

Kawabe et al., "A Framework for 3D Modeling Constraint-Based Description and Non-Manifold Geometric Modeling", A Collection of Contributions based on Lectures Presented at the 2nd Toyota Conference, Organization of Engineering Knowledge for Product Modeling in Computer Integrated Manufacturing, Japan, Oct. 2-5, 1988, 325-357.

Kempfer, "CAD Jumps on Windows 3.1 Bandwagon", Computer Aided Engineering, 1993, 24-25.

Khan et al., "A Performance Evaluation of Storing XML Data in Relational Database Management Systems", WIDM, 2001, 31-38.

Khoshafian et al., "Object Identify", OOPSLA'86, 1986, 21, 406-416.

Kiesling, "ODBC in UNIX Environments", Dr. Dobbs Journal, Dec. 2002, 27(12), 16-22.

King et al., "TriStarp—An Investigation into the Implementation and Exploitation of Binary Relational Storage Structures", Proceedings of 8.sup.th (BNCOD) British National Conference On Data Bases, 1990, 64-84.

Krouse, "Geometric Models for CAD/CAM", Machine Design, Jul. 24, 1990, 99-105.

LeBlanc et al., "Design Data Storage and Extraction Using Objects", Concurrent Engineering: Research and Applications, 1993, 1, 31-38.

Leontiev et al., "On Type Systems for Object-Oriented Database Programming Languages", ACM Computing Surveys, Dec. 2002, 34(4), 1-50.

Levy et al., "Incremental Recovery in Main Memory Database Systems", IEEE Transactions on Knowledge and Data Engineering, Dec. 1992, 4(6), 529-540.

Lim et al., "Transaction Processing in Mobile, Heterogeneous Database Systems", IEEE Transactions on Knowledge and Data Engineering, Nov. 2002, 14(6), 1330-1346.

Mallet et al., "Myrtle: A Set-Oriented Meta-Interpreter Driven by a "Relational" Trace for Deductive Databases Debugging", Lecture Notes in Computer Science, 1999, 1559, 1-22.

Mariani, "Oggetto: An Object Oriented Database Layered on a Triple Store", The Computer Journal, 1992, 35(2), 108-118.

McMahon, "SED—A Non-Interactive Text Editor", Bell Laboratories, Aug. 15, 1978, 10 pages.

Melton et al., "SQL and Management of External Data", ACM SIGMOD Record, Mar. 2001, 30(1), 8 pages.

Mitchel, "The Logic of Architecture", Massachusetts Institute of Technology, 1990, 139-143.

Navathe, "Evolution of Data Modeling for Databases", Communications of the ACM, Sep. 1992, 35(9), 112-123.

Nelson et al., "Generic Support for Caching and Disconnected Operation", $4^{th}$ Workshop on Workstation Operating Systems (WWOS-IV), Napa, CA. USA, Oct. 14-15, 1993, 5 pages.

Nijssen et al., "Conceptual Schema and Relational Database Design", A Fact Oriented Approach, Department of Computer Science, University of Queensland, Prentice Hall, 1989, 10-33, 42-43, 48-51, 156-170.

Orenstein et al., "Query Processing in the Object Store Database System", ACM SGIMOD, International Conference on Management of Data, Jun. 1992, 21(2), 403-412.

Ottogalli et al., "Visualisation of Distributed Applications for Performance Debugging", Lecture Notes in Computer Science, Jan. 2001, 2074, 831-840.

Pachet et al., "A Combinatorial Approach to Content-Based Music Selection", Multimedia Computing and Systems, Florence, Jul. 1999, 1, 6 pages.

Papiani et al., "A Distributed Scientific Data Archive Using the Web. XML and SQL/MED", SIGMOD Record, Sep. 1999, 28(3), 7 pages.

Ponnekanti et al., "Online Index Rebuild", AMC SIMOD International Conference on Management of Data, Dallas, Texas, United States, 2000, 529-538.

Powell, "Object, References, Identifiers. and Equality White Paper", OMG TC Document 93.7.5, Jul. 2, 1993, 1-24.

Prosise, "2-D Drafting: Why Pay More?", PC Magazine: The Independent Guide to IBM-Standard Personal Computing, 1993, 12(4), 255-289.

Ramsey et al., "An Algebraic Approach to File Synchronization", Software Engineering Notes, Association for Computing Machinery, Sep. 2001, 26(5), 175-185.

Read, Ill, "Developing the Next Generation Cockpit Display System", IEEE, Aerospace and Electronics Systems Magazine, Oct. 1996, 11(10), 25-28.

Reiner et al., "Benefits of X-based Three-Tier Client/Server Model with ESRI Applications", Virtual Solutions, 1995, 9 pages.

Rosenblum et al., "The Design and Implementation of a Log-Structured File System", Proceedings of the 13th ACM Symposium on Operating Systems Principles, Jul. 24, 1991, 1-15.

Rouse, "CAD Pioneers are Still Trailblazing", Machine Design, Oct. 22, 1987, 59(25), 117-122.

Roussopoulos et al., "Using Semantic Networks for Data Base Management", Proceedings of the 1st International Conference on Very Large Data Bases, 1975, 144-172.

Santos et al., "Computer Aided Mechanical Engineering Design Environment for Concurrent Design Process", Proceedings of the 1993 ITEC Workshop on Concurrent Engineering, Simulation in Concurrent Engineering, May 4-6, 1993, 71-83.

Seshadri, "Enhanced Abstract Data Types in Object-Relational Databases", The VLDB Journal, The International Journal on Very Large Databases, Aug. 1998, 7(3), 130-140.

Simoes et al, "A RISC-Microcontroller Based Photovoltaic System for Illumination Applications", Fifteenth Annual IEEE: Applied Power Electronics Conference and Exposition (APEC 2000), New Orleans, LA, USA, Feb. 6-10, 2000, 2, 1151-1156.

Simon, "Strategic Database Technology: Management for the Year 2000", Morgan Kaufmann Publishers, 1995, 446 pages.

Singhal et al., "DDB: An Object Design Data Manager for VLSI CAD", Proceedings of the 1993 ACM SIGMOD international conference on Management of data, Washington, D.C., United States, 1993, 467-470.

Sreekanth et al., "A Specification Environment for Configuring a Discrete-Part Manufacturing System Simulation Infrastructure", International Conference on Systems, Man and Cybernetics, Le Touquet, France, Oct. 17-20, 1993, 1, 349-354.

Sreenath, "A Hybrid Computation Environment for Multibody Simulation", Mathematics and Computers in Simulation, Aug. 1992, 34(2), 121-140.

Stevens, "Value in 3-D", Industry Week, Jan. 8, 1995, 45-46.

Stonebraker, "The Case for Partial Indexes", SIGMOD Record, Dec. 1989, 18(4), 8 pages.

Strickland, "Intersection of Relational and Object", Proceedings of the AM/FM International Conference XVII, Mar. 14-17, 1994, 69-75.

Sutherland et al., "The Hybrid Object-Relational Architecture (HORA): An Integration of Object-Oriented and Relational Technology", Proceedings of the 1993 ACM/SIGAPP symposium on Applied computing: states of the art and practice, Indianapolis, Indiana, United States, 1993, 326-333.

Suzuki et al., "Geometric Modeling for Modeling Products", Proceedings of the Third International Conference on Engineering Graphics and Descriptive Geometry, Vienna Austria, Jul. 11-16, 1988, 2, 237-243.

Taylor et al., "An Integrated Robot System Architecture", Proceedings of the IEEE, Jul. 1983, 71(7), 842-856.

Tripp, "Be prepared and have no regrets! Crisis Management for Database Engineers", SQL Server Magazine, No. 12, Shoeisha Co., Ltd., Japan, Dec. 15, 2003, 12, 30-37.

Tripp, "Forewarned is Forearmed! Critical Management for Database Engineer", SQL Server Magazine, Shoeisha Co., Ltd., Japan, Dec. 15, 2003, 12, 30-37.

Varlamis et al., "Bridging XML-Schema and Relational Databases. A System for generating and Manipulating Relational Databases using Valid XML Documents", DocEng' 01, Nov. 9-10, 2001, 10 pages.

Watanabe, "Knowledge Integration for Architectural Design", Knowledge-Based Computer-Aided Architectural Design, 1994, 123-146.

Waugh, "Specifying Metadata Standards for Metadata Tool Configuration", Computer Networks and ISDN Systems, Apr. 1998, 30(1-7), 23-32.

Wilcox, "Object Databases-Object Methods in Distributed Computing", Dr. Dobbs Journal, Nov. 1994, 19(13), 26-34.

Wold et al., "Content-Based Classification, Search, and Retrieval of Audio", IEEE Multimedia, 1996, 3(3), 27-36.

Yoshikawa et al., "XReI: A Path-Based Approach to Storage and Retrieval of XML Documents Using Relational Databases", ACM Transactional on Internet technology, Aug. 2001, 1(1), 1-29.

* cited by examiner

NON-VOLATILE MEMORY CACHE PERFORMANCE IMPROVEMENT

CROSS REFERENCE TO RELATED PATENT APPLICATIONS

This application is a divisional application of U.S. patent application Ser. No. 10/837,986, filed May 3, 2004, currently pending, which is incorporated herein by reference in its entirety.

This application is related to the following previously-filed applications: "Method And Apparatus To Reduce Power Consumption And Improve Read/Write Performance Of Hard Disk Drives Using Non-Volatile Memory," U.S. patent application Ser. No. 10/372,734, filed Feb. 21, 2003; "Apparatus And Method To Decrease Boot Time And Hibernate Awaken Time Of A Computer System," U.S. patent application Ser. No. 10/186,164, filed Jun. 27, 2002; and "Improved Reliability Of Diskless Network-Bootable Computers Using Non-Volatile Memory Cache," U.S. patent application Ser. No. 10/304, filed Nov. 26, 2002.

FIELD OF THE INVENTION

This invention relates generally to computer systems, and more particularly, to improving the performance of computer systems by using non-volatile memory in conjunction with a long-term storage unit.

BACKGROUND OF THE INVENTION

Certain storage devices are used on computer systems in order to provide persistent memory for the functioning of the computer system. For example, a magnetic hard disk drive assembly is well known in the art. However, such persistent memory has some drawbacks. It is time consuming to prepare the magnetic hard drive for reading or writing data. In order to do so, in most cases, it is necessary to physically initiate spinning of the disk, and to position a read/write head over the proper location.

The preparation for reading or writing from the storage devices is time- and power-consuming. Additionally, noise may be generated by such a magnetic hard drive memory and its components. Thus, there is a need for an improved memory for computer systems which will remedy some of these drawbacks.

New compositions and configurations of persistent storage devices may provide some improvements in performance related to the storage. However, simply using traditional techniques for accessing persistent storage will not provide the full benefit of such new compositions or configurations. Generally, an operating system is used to control the operations of the computer system. The operating system also mediates between other applications in the computer system and the hard disk. Thus, there is a need for methods such as application programming interfaces (APIs) to provide enhanced performance. Similarly, there is a need for systems which create new configurations and new control techniques for storage for use by a computer systems.

SUMMARY OF THE INVENTION

A persistent storage device in which one or more long-term storage media are included along with a non-volatile memory is used with an operating system providing or responsive to application program interfaces, commands, and interrupts which allow the operating system or an application program to effectively use the non-volatile memory in order to increase performance time and efficiency. While it is contemplated that the non-volatile memory be included physically with the long-term storage medium, it is also possible for the non-volatile memory to be separate form the long-term storage medium but to function along with it to provide persistent storage.

In one embodiment, application program interfaces (APIs) are exposed which allow for a request that the long-term storage medium be spun up or spun down. Other APIs allow for requests that the non-volatile memory be flushed or populated with data from specified addresses of the long-term storage medium. Still others allow data to be written directly to the long-term storage medium, allow data to be written as an atomic write, or allow data written to the non-volatile memory cache to be ignored rather than saved for writing to the long-term storage medium. Additionally, a request to find and give details about existing non-volatile memory available for such storage is provided for.

In one embodiment, the non-volatile memory can be used in one of two ways. In a first way, a cache is provided in non-volatile memory. This cache is used as a read cache for data read from the long-term storage medium and also as a write buffer for data being written to the long-term storage medium. In this way, reads and writes to the long-term storage medium, instead of occurring sporadically, may be clustered together, requiring fewer reads from, writes to, and preparations of the long-term storage medium.

A portion of the non-volatile memory can be owned by the operating system or another application directly. Certain logical sector addresses (LSAs) from the long-term storage medium are mapped to the non-volatile memory, and reads from or writes to these LSAs will be performed in the non-volatile memory. This mapping can occur alongside the caching in a non-volatile memory portion described above.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
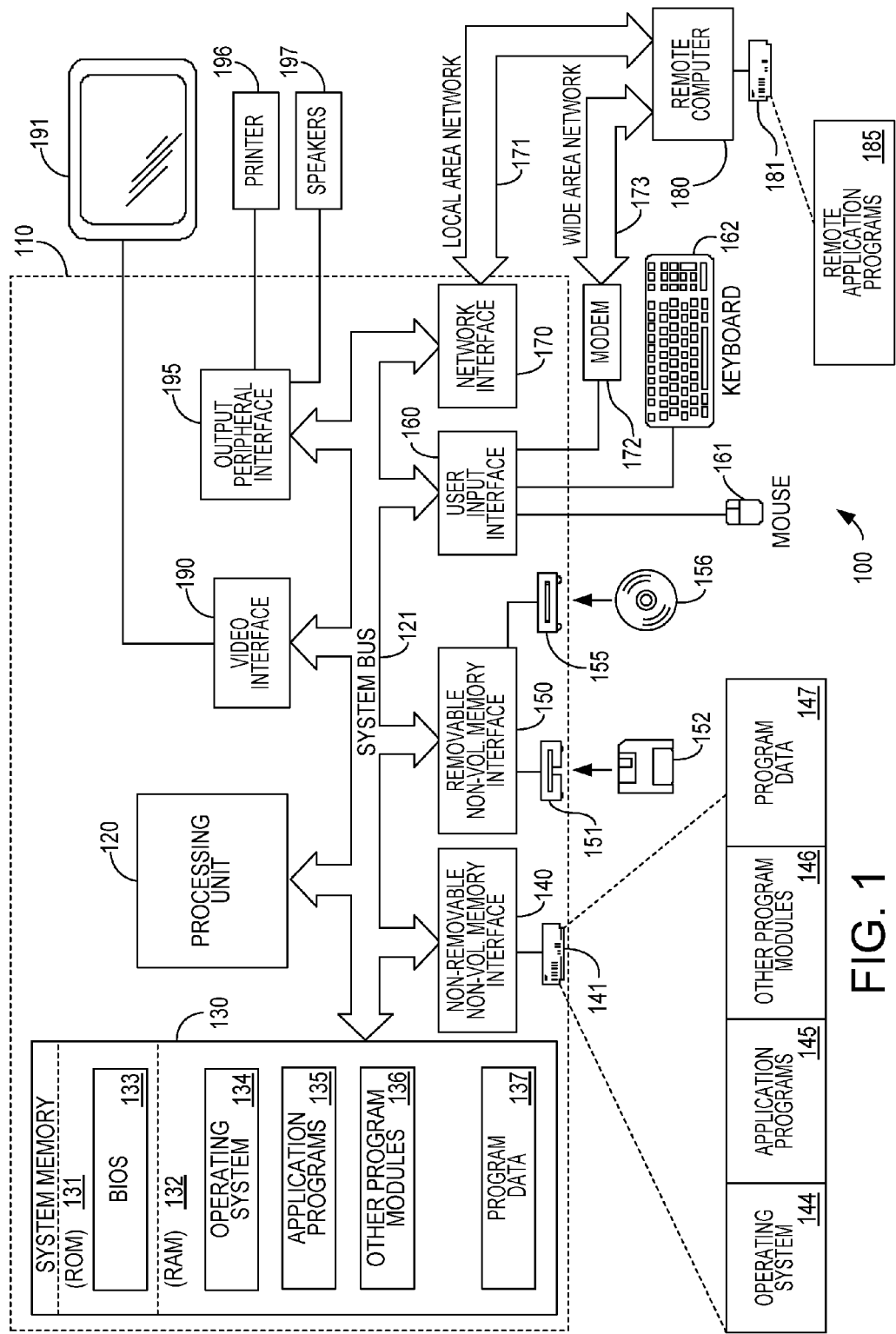
FIG. 1 is a block diagram generally illustrating an exemplary computer system on which the present invention resides.

In the description that follows, the term "NV memory" will be used to refer to solid state non-volatile memory. NV memory means any type of memory that retains its data when power is removed and that can be erased and reprogrammed with new data. The NV memory may include battery-backed up memory. The NV memory may be located in a computer as a separate component of the computer such as a personal computer slot card or as a component in system memory. Alternatively, it could be a component of a persistent storage device such as a hard drive, in a docking station of a notebook device and the like. On mobile systems, the track buffer memory the disk drives have can be used (i.e., the invention can also be implemented using the track buffer memory).

Future disks for mobile systems may draw from battery power to keep its memory alive without actually drawing power to keep the disk spinning. The NV memory may store file data, file metadata, as well as known disk sectors such as the boot sector and partition tables. During power down or entry into a hibernate mode, the computer system determines the static and dynamic configuration data to be stored in NV memory based on a history of prior uses. Data is also stored in the NV memory during system operation to reduce the number of times the disk drive is spun up. For mobile PCs and the like, reducing the number of times the disk drive is spun up improves user experience because power is reduced, thereby allowing smaller and lighter mobile PCs and the like that last longer on a given battery capacity. It also reduces the need to run noisy, high speed fans that are loud and annoying to the user.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Inclusion of NV Memory in the Computer 110

Figure 2:
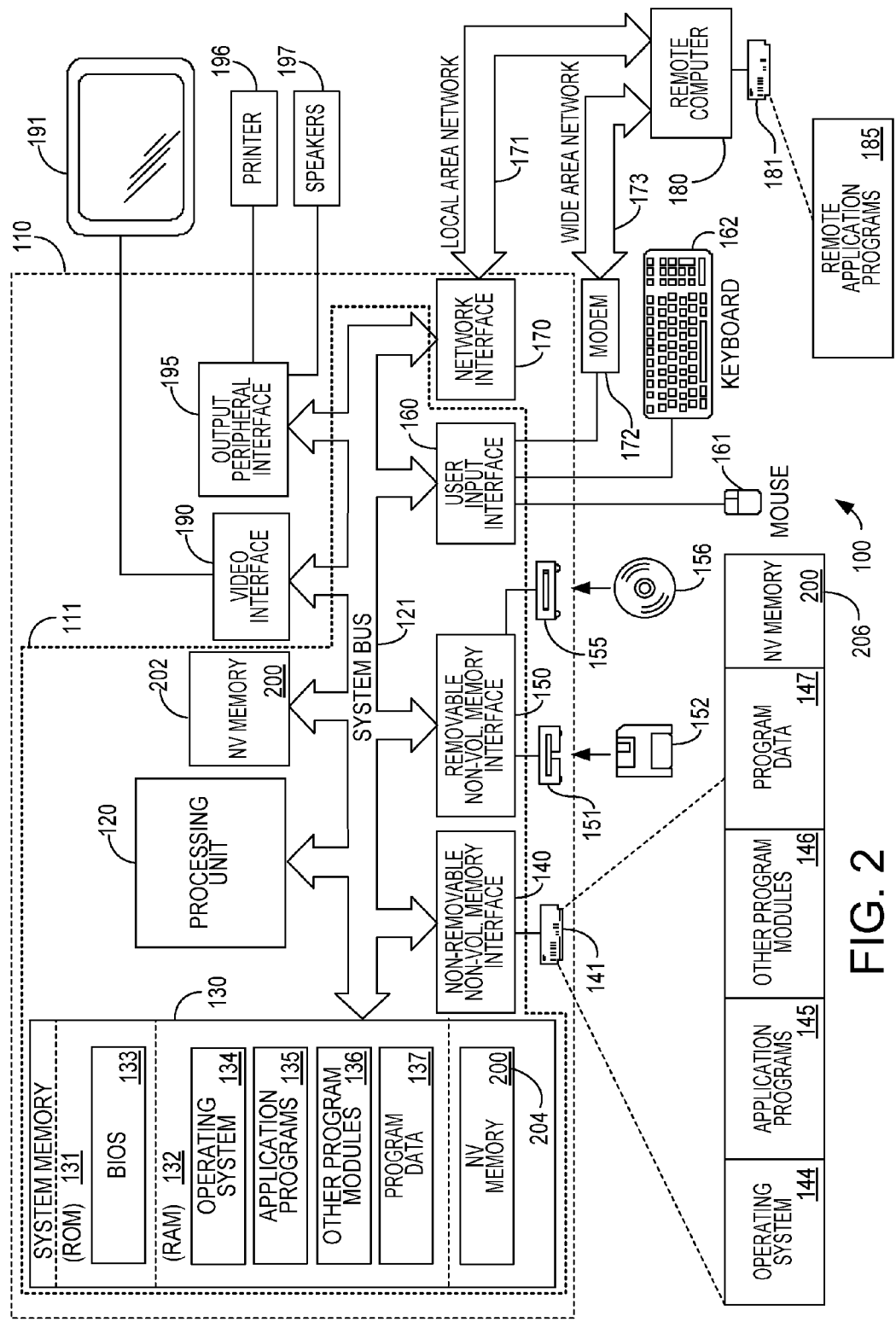
FIG. 2 is a block diagram of the exemplary computer system of FIG. 1 generally illustrating locations where the present invention may be implemented.

Turning now to FIG. 2, the NV memory 200 may be located in the computer 110 as a separate component 202 of the computer 110 such as a card to be put in a pc slot or as a component 204 in system memory. Alternatively, it could be a component 206 of a persistent storage device 300 such as a hard drive 141, in a docking station of a notebook device and the like. Another alternative location for NV memory 200 is in the form of a removable solid state non-volatile memory device which can be plugged in to the computer system, such as one according to the CompactFlash specification as maintained by the CompactFlash Association, or similar. The NV memory 200 as a separate component 202 provides the capability to improve performance on legacy systems that do not have NV memory 200 without having to install a hard drive having NV memory.

Figure 3:
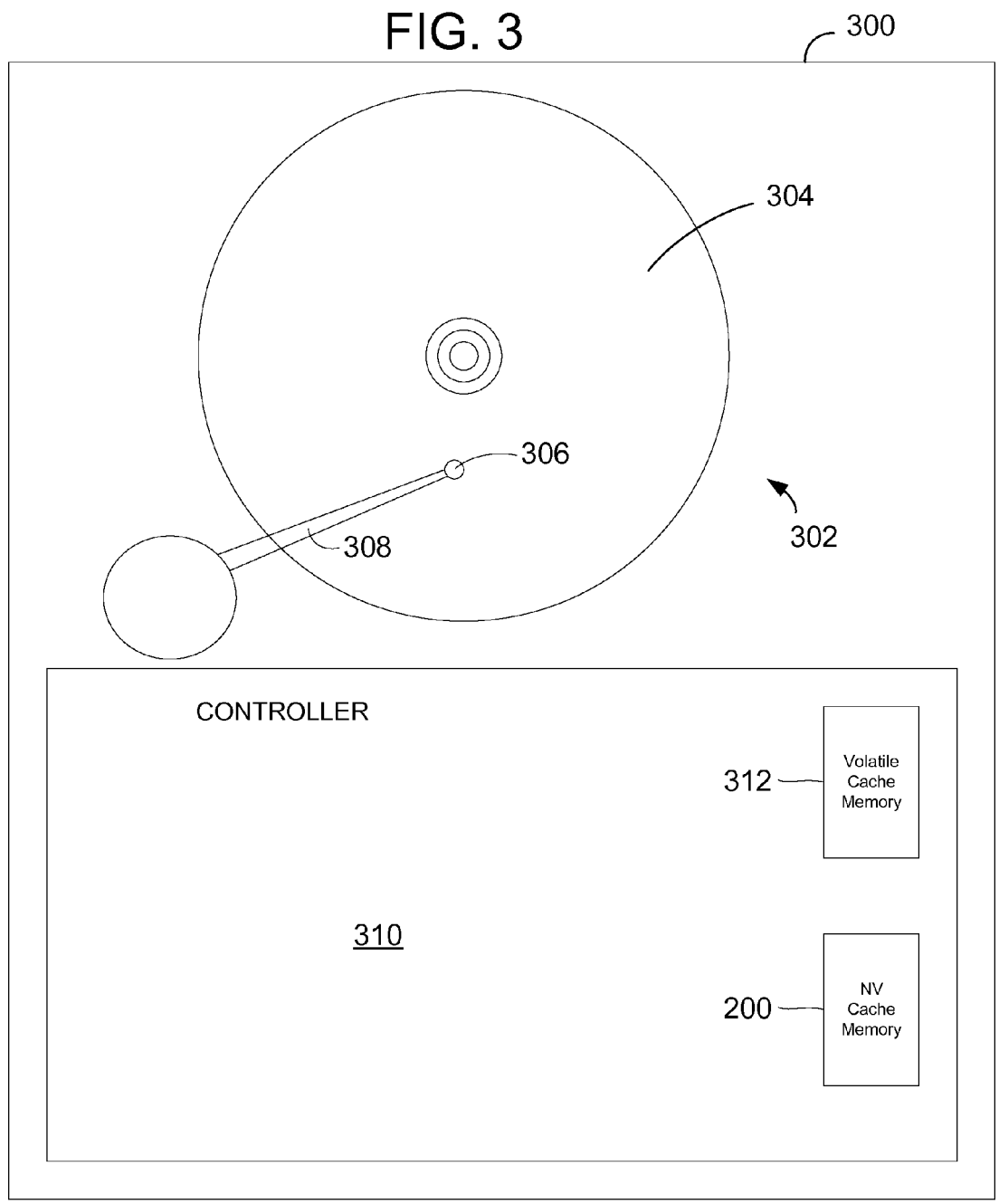
FIG. 3 is a block diagram of a persistent storage device according to one aspect of the invention.

Turning now to FIG. 3, the persistent storage device 300 has a disk assembly 302 that includes a non-volatile memory storage medium (a long-term storage medium) such as one or more disks 304, a read/write head 306 for reading and writing to the disk 304, and a spindle/armature assembly 308 for moving the read/write head 306 to locations on the disk 304. While a disk assembly 302 is shown in FIG. 3 and used in the following description, the advantages of the inventive techniques may be found when another long-term storage medium is used, and there is no limitation of the invention to instances where a disk assembly is used as a long-term storage medium. The controller 310 commands the disk assembly to read data from the storage medium or write data to the storage medium. A cache memory 312 is used to buffer data being read from or written to the storage medium. The NV memory 200 of the present invention is located within the controller 310 or as a separate component of the persistent storage device 300. In one embodiment, the NV memory 200 is exposed to the computer 110 to appear as at least one large region of the disk 304 comprised of one or more contiguous sectors. No change to the IDE (Integrated Drive Electronics) or SCSI (Small Computer System Interface) specifications is required. The NV memory 200 is exposed to the operating system so that the operating system and other components can query the size of the NV memory 200, control the state of the NV memory 200, write data to the NV memory 200 using a transactional procedure, and as stated above, use the NV memory 200 as a write buffer. In an alternate embodiment, the computer 110 can detect the presence of NV memory by observing access times of 500 microseconds or less for large regions of the disk 304 instead of the typical times of approximately 10 milliseconds.

Operating System and Host Application Use of NV Memory

With reference again to FIG. 2, in order to take advantage of an NV memory 200 to improve performance, according to one embodiment of the invention, the operating system (OS) 134 is provided with various interfaces in order to provide for improved use of the NV memory 200.

First a detection interface is provided. OS 134 can detect whether there is an NV memory 200, and the size of the NV memory. This functionality is exposed as an interface which the application programs 135, and other program modules 136 can use in order to determine if NV memory 200 exists in the computer 110. Additionally, OS components, such as file systems or other object stores, can use the detection interface to determine the existence and size of NV memory 200 on the computer 110. Other information regarding the NV memory 200 may also be provided such as usage information or type information. This information may be useful because certain NV memories have limited lifespans, and this may affect the usage of the NV memory 200 in certain situations.

In order to read from or write to a disk 304 in disk assembly 302, the disk must be spun up, and the read/write head 306 must be moved to the appropriate location by spindle/armature assembly. This preparatory action takes time and causes a delay before data can be read from or written to disk assembly 302. The preparatory action in writing to the disk 304 will be referred to as spinning up the disk, even though it encompasses moving the read/write head 306 as well. Indeed, while the disk is pictured as a rotating media, it is contemplated that in a persistent storage device 300, a NV memory 200 may be included along with another form of the long-term storage medium (other than disk assembly 302) which requires preparatory action before data can be written to or from the memory. Any preparatory action for the use of the long-term storage medium on the persistent storage device 300 will be known as "spin up" or "spinning up" the memory, even though it is contemplated that there may be additional preparatory actions, or even that an actual spinning of a rotating medium may not be involved. Because an application or the operating system 134 itself may recognize in advance of a write to the persistent storage device 300, that a significant probability exists that such a write requiring a spin up of the long-term storage medium on that device 300 will occur, delays causes by the need to wait for the spin up of long-term storage medium can be obviated through the use of an interface which allows an application or the operating system 134 to request a spin up of the long-term storage medium.

Similarly, a spin down interface is also provided. In order to save power consumption, if no writes are being made to the disk assembly 302 of persistent storage device 300, then the spinning of the disk 304 may be halted. Again, while the persistent storage device 300 is shown as including a rotating medium, where an actual spin down will reduce power consumption, other forms of long-term storage media on the persistent storage device 300 aside from NV memory 200 are contemplated, and such long-term storage media may have actions analogous to the spin down of the disk assembly 302, in which some benefit is gained by ceasing the action which allows immediate or relatively swift reads and writes to that memory. Such cessation of an action may not actually include a physical spinning down of a rotating medium, however, such cessations are contemplated by the "spin down" or "spinning down" referred to herein.

The spin down and spin up actions may be performed at less than their maximum speeds. Performing such operations at slower speeds can lessen the acoustic noise associated with these actions and lessen any associated spikes in power consumption. Because the spin up and spin down (or other preparatory actions for the long term storage medium) can be performed in advance of an absolute need for such actions, these advantages may be obtained without a performance impact. When a disk is spun up slowly, rather than quickly, the disk will be available when it is fully spun up, but the effects on the user and the rest of the system are minimized.

Some or all of the NV memory 200 may be used as a write cache for the disk assembly 302 of a persistent storage device 300. In such a case, an interface is provided for the situation in which an application or the operating system 134 may determine that for performance reasons, the NV memory 200 should be flushed to the other memory in the persistent storage device 300. This interface flushes the NV memory 200 to the long-term storage medium.

Different portions of NV memory 200 may be marked with different priorities. For example, an area of NV memory 200 may be "pinned" or marked with a high priority should be maintained in NV memory 200 rather than being flushed to long-term storage medium preferably to other areas of NV memory 200 which are not pinned or marked in this way. One embodiment of the invention allows one of a number of priorities to be assigned to areas in NV memory 200. For example, there may be three priorities, a highest priority (or "pinned' memory or "priority 1" memory), a second priority ("priority 2") and a lowest priority (or "priority 3"). Where space is needed in the NV memory 200, the lowest priority memory is flushed to long-term storage medium before higher priority memory areas will be flushed. Thus, according to one embodiment of the invention, several interfaces options for flushing the NV memory 200 cache may be presented e.g., one which flushes the entire cache, one which flushes only lower-priority areas of the cache, or one which flushes all areas of the cache with a priority equal to or less than a priority specified in call to the interface.

As another performance improvement, because data written to the NV memory 200 may later be deleted, an interface is presented which allows the OS 134 or an application to signal to the NV memory 200 that certain data written to the NV memory 200 is no longer required, and can be discarded from the NV memory 200 write cache. In this way, when the memory is flushed, the discarded areas will not be written to the long-term storage medium, and when a read is performed on the discarded area, an error or random data may be returned.

This interface can be used, for example, in order to manage transactions. Often transaction logs contain intermediate data which is not required to be stored long term. For example, in one case, when a transaction occurs, meta-data about the transaction is first committed to the log. If this log is stored in NV memory 200, the write will not require a spinning up of the disk. When the transaction is completed and the changes committed, the stored meta-data about the transaction is changed or deleted to reflect the completed transaction. If, however, the transaction is interrupted before it can be completed and committed, the data in the NV memory 200 will persist and thus can be used to determine what transaction was occurring and solve problems regarding such interrupted transactions.

In another example, this interface can be used to avoid flushing to disk any data or metadata related to temporary files. Initially, these files and their metadata get created in the NV memory 200. When the files are deleted, the OS 134 or an application may signal NV memory 200 that the file data and metadata written to the NV memory 200 is no longer required, and can be discarded from the NV memory 200 write cache.

A NVM circumvention interface is also provided. In certain situations, use of the NV memory may not be efficient for read or write operations. With reference again to FIG. 3, for example, if an application is writing to persistent storage device 300 data that is large relative to the size of the NV memory 200, writing some of that data to the NV memory 200 will not be generally useful, as the NV memory 200 will fill and the data will then need to be flushed from the NV memory 200 to the long-term storage medium. Thus, the NVM circumvention interface allows the operating system or an application using the interface to specify that data to be read from or written to the persistent storage device 300 should be directly read from or written to the physical memory addresses on the long-term storage medium rather than to the NV memory 200.

In one embodiment, an interrupt is sent from the persistent storage device 300 to the host computer 110 when the disk controller in the persistent storage device 300 is preparing to or actually spinning up the disk assembly 302. This interrupt may be transmitted to the operating system 134 or its components or to an application. Upon receipt of such an interrupt, a recipient which is properly programmed to act opportunistically can ensure that data is moved from the NV memory 200 to the long-term storage medium or from the long-term storage medium to the NV memory 200, as the long-term storage medium is soon to be spun up and ready for such movements. This reduces the number of long-term storage medium spin-ups and therefore reduces disk drive power consumption. Additionally on receipt of the interrupt indicating that the memory is spinning or spun up, the OS can use the NVM circumvention interface to flush any non-persistent write buffers or caches directly to the long-term storage medium.

Additionally, OS components and applications may use an atomic write interface which allows a write to the persistent storage device 300 to be treated as atomic. All data to be written atomically is stored in the NV memory 200. When this is completed, the persistent storage device ensures that all data to be written atomically is written to long-term storage medium. If a failure occurs before all of the data to be written atomically is stored in the NV memory 200, an error is returned, and the data which has been received is discarded. If, after the storage on the NV memory 200 is completed, the atomic write fails due to a system or power failure, the failure is detected when the system restarts, and the atomic set of data stored in the NV memory is rewritten to the long-term storage medium. This allows improved performance in applications and settings where atomic writes of large data are preferable, e.g. in database applications, since it does not require these applications to deal with the problem known in the art as "torn writes".

In one embodiment, the operating system 134, its components, or applications use the NV memory 200 to store specific files or objects that are used regularly. Thus more expensive writes/reads from long-term storage medium are avoided. For example, database transaction logs, file system metadata, and other metadata are stored in NV memory 200. Where a priority scheme is being used for assigning different priority to areas in NV memory 200 storing data, in one embodiment, such frequently-accessed files are accorded a high priority, which further helps to avoid expensive writes/reads to/from the long-term storage medium.

Partitioning of the NV Memory

In one embodiment, the NV memory 200 includes a partition which allows a portion of the NV memory 200 to be used exclusively by the operating system. One implementation of this is to allow the operating system 134 to partition the NV memory 200, and to have an OS partition of the NV memory 200 which is controlled directly by the disk controller firmware with input from the operating system.

Thus, through the disk controller, the OS 134 requests the population of the NV memory 200 cache with specific sectors that it are likely to be needed next. For example, these sectors are the sectors which are needed or are thought likely to be needed at the time of the next boot, or when the system resumes from hibernation. As a further example, these sectors are sectors that the OS 134 predicts it will need in the near future.

Thus, in such an embodiment, each time the long-term storage medium is spun up the OS can repopulate the OS partition of the read cache in the NV memory 200 by sending a list of logical sector addresses (LSAs) to the disk drive controller. This list can include priority information to be used according to a priority scheme as described above to indicate how readily the disk drive controller will overwrite the read cache data with write buffering data.

Within the OS 134, a mechanism is provided to map a specific set of LSAs to the NV memory 200. This allows a section of the NV memory 200 to be directly under the OS 134's control. Reads and writes to these LSAs will then always access the NV memory 200. The data in these LSAs will not be flushed to the storage unit unless the NV memory is reconfigured by the operating system. In one embodiment, in this section of NV memory 200, the OS 134 stores "black box recorder information," i.e. a recent history of operations that is used to diagnose system failures. The OS 134 stores the boot recovery console and files required for safe boot so that the system can still boot and diagnose mechanical disk failures. It may also store a possibly compressed package of files required for the next boot to be used in place of or in addition to the regular representation of system files.

The interfaces and commands as described above are set forth in the following Table 1:

TABLE 1

Interfaces and Commands For Use Of A Persistent Storage Device

| Command | Data for Command | Drive Behavior |
| --- | --- | --- |
| Query NVM | | Determine the existence of an NV memory for use; additionally can be used to determine the size or other information regarding the NV memory |
| Spin Up Disk | | Prepare the disk for read/write (R/W) access. Opportunistically flush data from write buffer to disk. |
| Spin Down Disk | | Park the R/W heads and turn off the disk spindle to save power and reduce wear. |
| Flush NVM Cache | | Move all modified sectors from the NV memory cache to the disk. |
| Flush NVM Cache - unpin | | Same as Flush NVM cache but pinned blocks are also removed. |
| Flush NVM Cache - All | | Flush all modified data in mapped portion and in R/W cache to disk. |
| Populate NVM Cache | List of LSAs and priorities (e.g., 1 = pin, 2 = remove after priority 3 sectors, 3 = remove as needed) | Spin up disk. Flush cache to disk. Copy data from the disk to the NV memory cache as defined by list. Store list in NV memory cache along with their LSAs and priority. |
| Write through NVM Cache | | Write data directly to disk rather than buffering in the NV memory. |
| Atomic write | Number of sectors | Write the next N sectors of data as an atomic unit. If the disk drive controller fails to write these N sectors into non-volatile storage (either NV memory or disk) an error is returned, the data is ignored, and the NV memory cache or disk space is reclaimed. Note that this may occur across a power cycle so the data must be stored in the cache with meta-data that specifies whether the atomic write completed or not. |
| Ignore recent write | List of LSAs to ignore | If the sector is still in the write buffer and has not been moved to the disk then the sector data is not moved to the disk but discarded. The corresponding space in the write buffer can be overwritten by the controller for future write buffering. |
| Map NVM partition | List of LSAs that are to be mapped from disk to NVM | Described below; when a portion of the NV memory is mapped for the operating system 134 or other application; Flush all data from cache and mapped portions of NV memory to disk. Copy data from disk to NV memory for mapped LSAs. Re-populate cache portion with read cache list if room. |

Copy-on-Write Functionality

Databases and database products, among other applications and products, may use copy-on-write functionality in order to reduce the consumption of resources such as time and memory. Copy-on-write allows previous versions of data to be made available. This is useful because, in addition to a current version of the information stored in, for example, a database, previous versions of the information may be useful to a user.

Without copy-on-write, one way to provide information on previous versions of data is to make a complete copy of the database at a point in time which may be of interest to a user. When this occurs, all files associated with the database are stored. However, this technique is space intensive, because for a database which is stored in a certain amount of storage space, each copy will also require that amount of storage space. This approach may also be time consuming, as the copy itself involves movement of lots of data.

Thus, instead, changes from the original version may be stored. Where NV memory 200 is available, it can be used for performing copy-on-write activities. In a first implementation of copy-on-write, the original data which is to be changed is stored in the system memory 130. Before it is updated, then, a copy must be written to stable storage, in order to have the unchanged version of the data available. Where NV memory 200 is available, such storage may be to the NV memory 200. This allows the storage of the unchanged copy to be performed quickly. As described above, this copy may be moved to the disk storage at a later point. Database systems using block-oriented caching can use this to reduce time due to memory writes.

In a second copy-on-write implementation, the original version may be stored in a long-term storage medium. In such a case, if the data is located in the NV memory 200, an additional copy may be made in NV memory 200 before the write occurs. If the data is not stored in the NV memory, then the original stored copy may be treated as the archive copy—the copy which stores the unchanged version. The NV memory 200 stores the changed version. When this version is flushed from NV memory 200 or otherwise moved to the disk, the version will be written to a new location in memory 200, since the original stored copy on disk is now the archive copy of the data before changes.

Defragmentation Using NV Memory

Large data stores, e.g. file systems and databases, through constant storage and deletion of data may exhibit a condition known as fragmentation. This occurs when large ranges of free memory on a storage device become more and more sparse, and may lead to performance degradation. In order to correct this, defragmentation is used. Defragmentation processes reunite files in successive address spaces. In order to perform defragmentation, data files are moved within physical memory locations on the disk to create contiguously stored files. Thus, temporary storage locations are used; as the space occupied by a first file is used by a second file, the first file must be stored in some location so it is not lost.

In one embodiment, NV memory is used as a temporary storage location during defragmentation. Data is written to the NV memory. The location of other data is changed in order to increase the contiguousness of the storage of the other data. Then the data from the NV memory is written to the storage device being defragmented. When the data which has been temporarily stored is restored to the storage device (such as the hard disk of a computer system) the temporary copy is removed from NV memory. Thus defragmentation can occur without requiring the use of the long-term storage medium and the associated costs of such use for storing temporary data.

Control over the Persistent Storage Device

Figure 4:
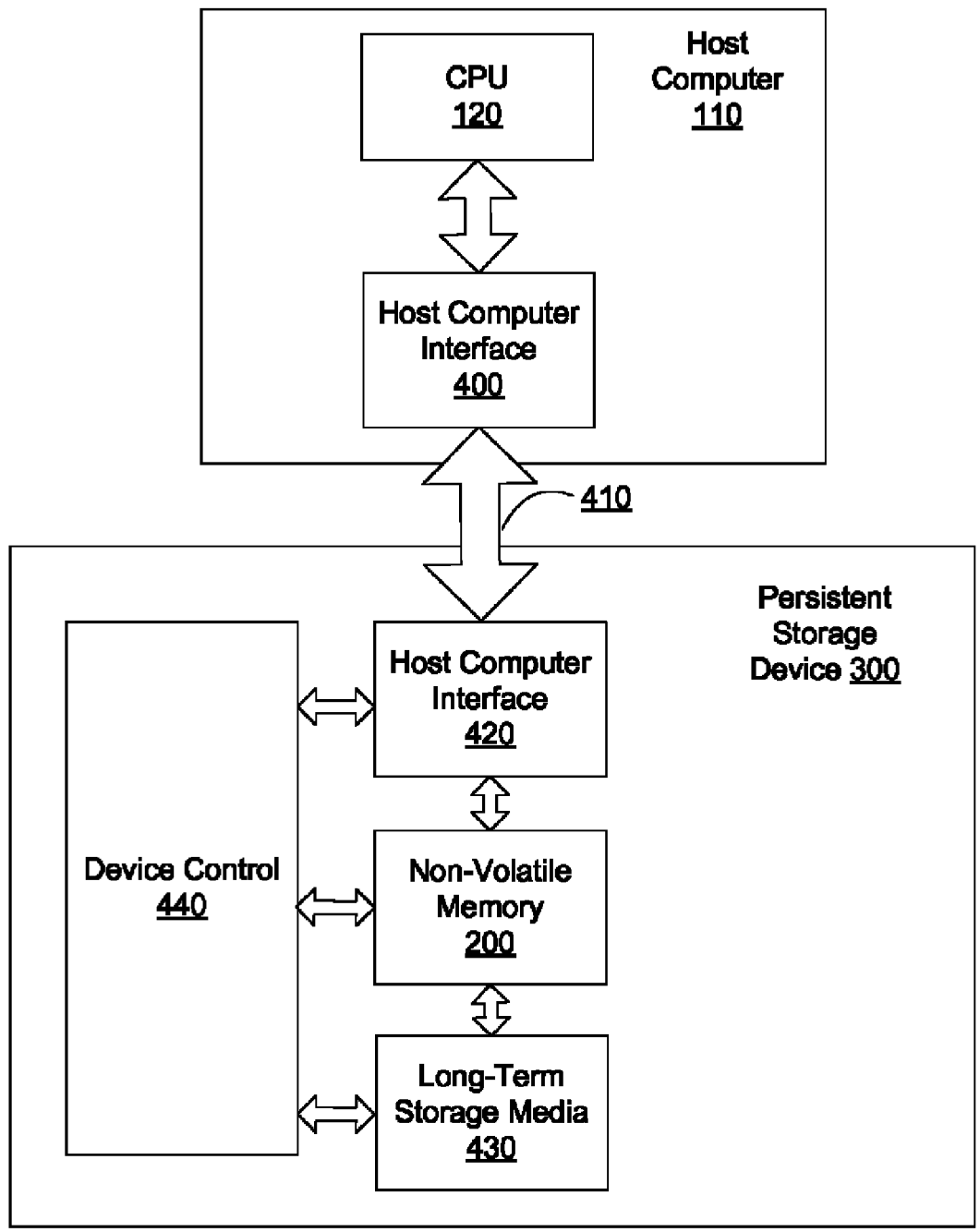
FIG. 4 is a block diagram of a persistent storage device according to one aspect of the invention.

As shown in FIG. 4 and described above, a persistent storage device 300 can include both a long-term storage medium 430 (e.g. the disk assembly 302 from FIG. 3). In such a situation, data from the CPU 120 travels between the host computer 110 and the persistent storage device 300. This flow is mediated by host computer interface 400 in host computer 110 and host computer interface 420 in the persistent storage device 300. Device control firmware 440 may directly or indirectly control storage in the NV memory 200 and the long-term storage medium 430.

In order to begin use of the persistent storage device 300, the operating system 134 queries the storage unit configuration, as described above, to determine whether a NV memory 200 is available and, if so, size and other parameters of the NV memory 200, such as type, utilization history, etc. Then a determination is made regarding how the NV memory 200 will be utilized.

Utilization of the NV memory 200 may be controlled in two ways. First, some portions of NV memory 200 may be under the control of the storage unit. Second, some portions of the NV memory 200 may be under the direct control of the OS 134. As discussed above, when a portion of the NV memory 200 is under direct control of the OS, that portion is used to map a specific set of LSAs. Reads and writes to these LSAs will then always access the NV memory 200 at the mapped portions. The data in these LSAs will not be flushed to the storage unit unless the NV memory is reconfigured by the operating system.

The portion of the NV memory 200 which is not under direct operating system control is used as a cache. This cache portion serves double duty as a read cache and as a write buffer. When the write buffer is flushed to the disk the OS opportunistically re-populates the NV memory 200 with data from the disk to serve as a read cache. This cache data is overwritten with write buffer data. Eventually the read cache is completely overwritten by the write buffer data, at which time the buffer is full, the storage unit controller spins up the disk, flushes the buffer data to the disk, repopulates the read cache, and spins down the disk.

Figure 5:
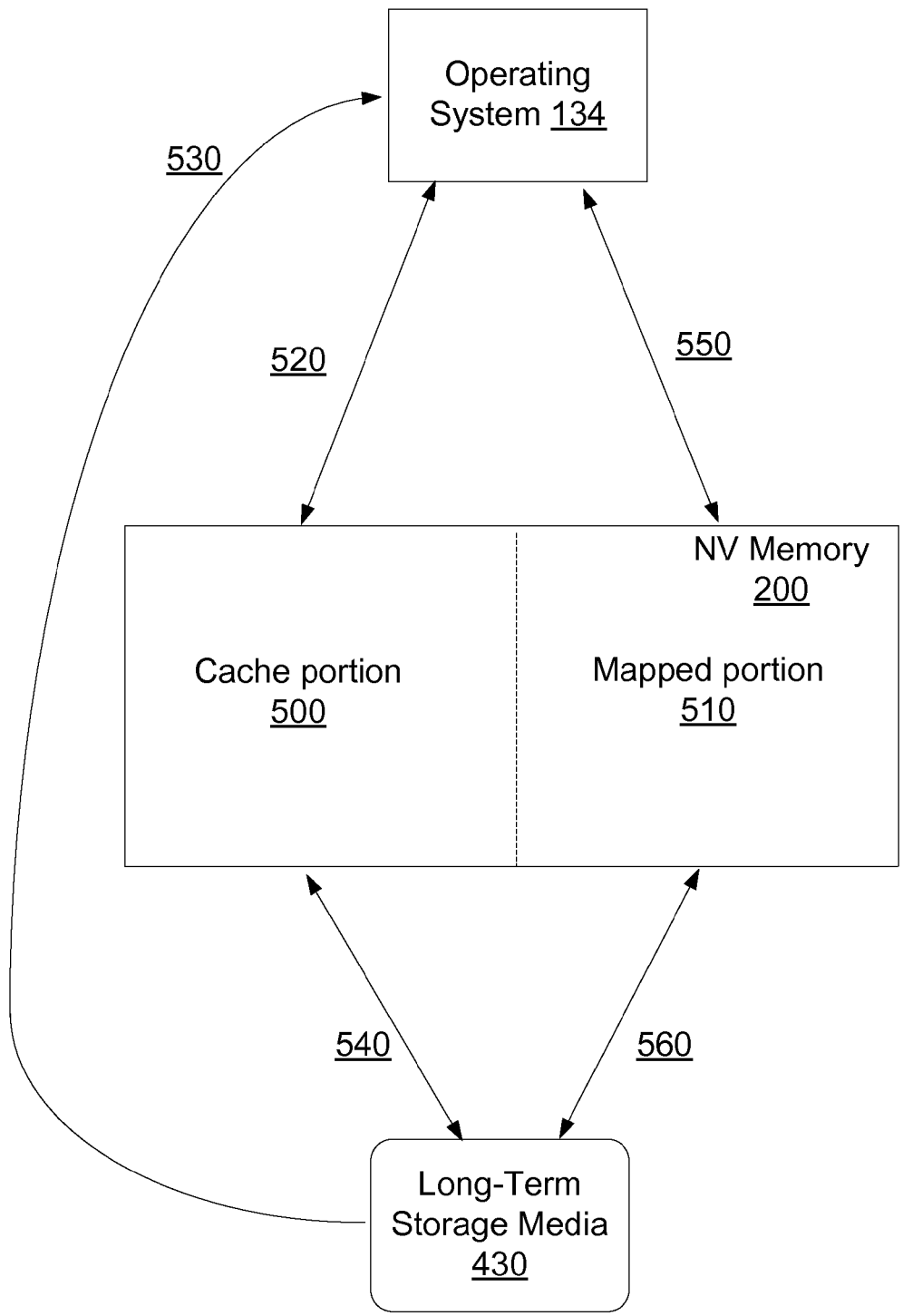
FIG. 5 is a block diagram illustrating the flow of data between the operating system, a non-volatile memory, and a long-term storage medium according to one embodiment of the invention.

The use of an NV memory with both a cache portion and a mapped portion is shown in FIG. 5. NV memory 200 is divided into a cache portion 500 and a mapped portion 510. As shown by arrow 520, data read from or written to LSAs which are not mapped to the mapped portion 510 is written to the cache portion 500; as shown by arrow 530, if the data being read from an LSA is not present in the cache portion, then it is read from the long-term storage medium 430. As discussed, the cache portion 500 functions as both a read cache and a write cache, arrow 540 shows that data in the cache portion 540 is flushed to the long-term storage medium 430, and data is copied from the long-term storage medium 430 to the cache portion 500 when there is room to use the cache portion 500 as a write buffer.

The mapped portion 510 is mapped to specific LSAs. Thus, as shown by arrow 550, when these LSAs are read from or written to, these reads and writes are directly from the mapped portion 510. Data in the mapped portion 510 does not get flushed to the long-term storage medium 430, nor does long-term storage medium 430 provide data to the mapped portion. The only exception to this is upon remapping. As shown by arrow 560, when a new mapping is created, data from the former mapping is copied to the long-term storage medium 430 and data from the disk for the new LSAs mapped is copied to the NV memory 200 (specifically, to the mapped portion 510.)

Control of Cache Portion 500

Figure 6:
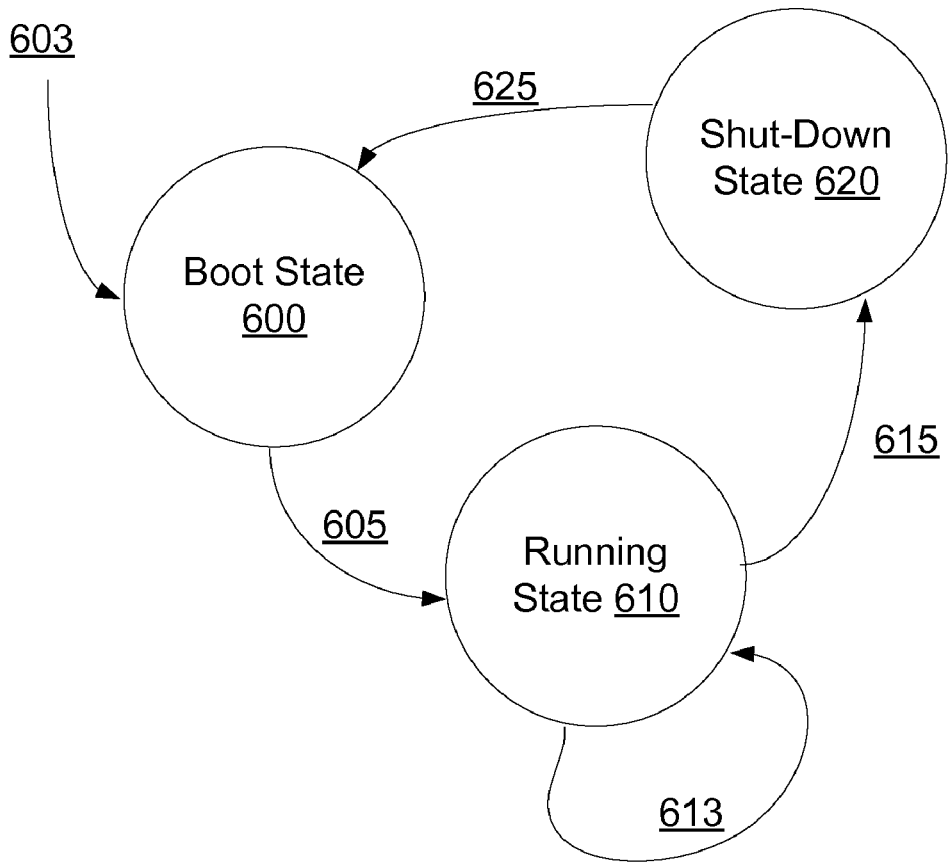
FIG. 6 is a state diagram of the state of the cache portion of a non-volatile memory according to one embodiment of the invention.

The control of the cache portion is defined by the state diagram shown in FIG. 6. As shown in FIG. 6, a boot state 600 is entered either during initialization (603) or during reboot after shutdown (625). After the boot state, as shown by transition 605, when the operating system moves to a running state 610, and sends a command to flush the cache and repopulate, along with a list of logical sector addresses with which to initially populate the cache. As shown by transition 613, each time this command to flush the cache and repopulate is received from the operating system 134, the operations of the running state 610 are performed again. In order to move to shut down state 620, transition 615, occurs. When a shutdown occurs, according to one embodiment, a command to flush and repopulate the cache, with an LSA list, is sent.

The disk drive controller firmware 440 reduces power consumption and improves reliability and performance by using the NV memory 200 in certain cases rather than using the slower disk 430. The disk drive controller 440 receives commands from the OS 136 to populate the cache portion 500 of the NV memory 200 with data from a specified list of logical sector addresses (LSAs). The list of LSAs also includes a prioritization of the sectors where highest priority sectors are least likely to be removed from the cache and lowest priority sectors are most likely to be removed. Once the cache 500 is populated, the disk 430 is spun down and the cache 500 is used as a write buffer. Sectors cached for read are overwritten as the buffer fills up according to their priority. The disk is only spun-up when there is a read cache miss, when the write buffer is full, or when an explicit spin-up command is received from the OS 134. In this way the disk 430 will remain off for long periods of time relative to the time it is turned on, thus reducing power and improving reliability. The highest priority LSAs are permanently pinned in the NV memory 200 cache until told otherwise by the OS 134.

Figure 7:
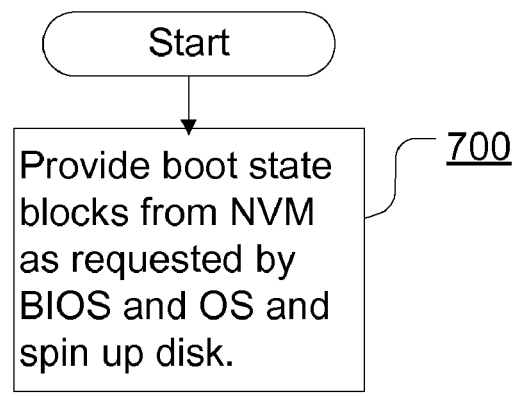
FIG. 7 is a flow diagram of the operations of the boot state according to one embodiment of the invention.

The operations in the boot state 600 are shown in FIG. 7. As shown in FIG. 7, step 700, the boot state blocks from the NV memory 200 are provided, as requested by the BIOS and the operating system 134. In parallel, the long-term storage medium 430 (e.g. disk) is spun up.

Figure 8:
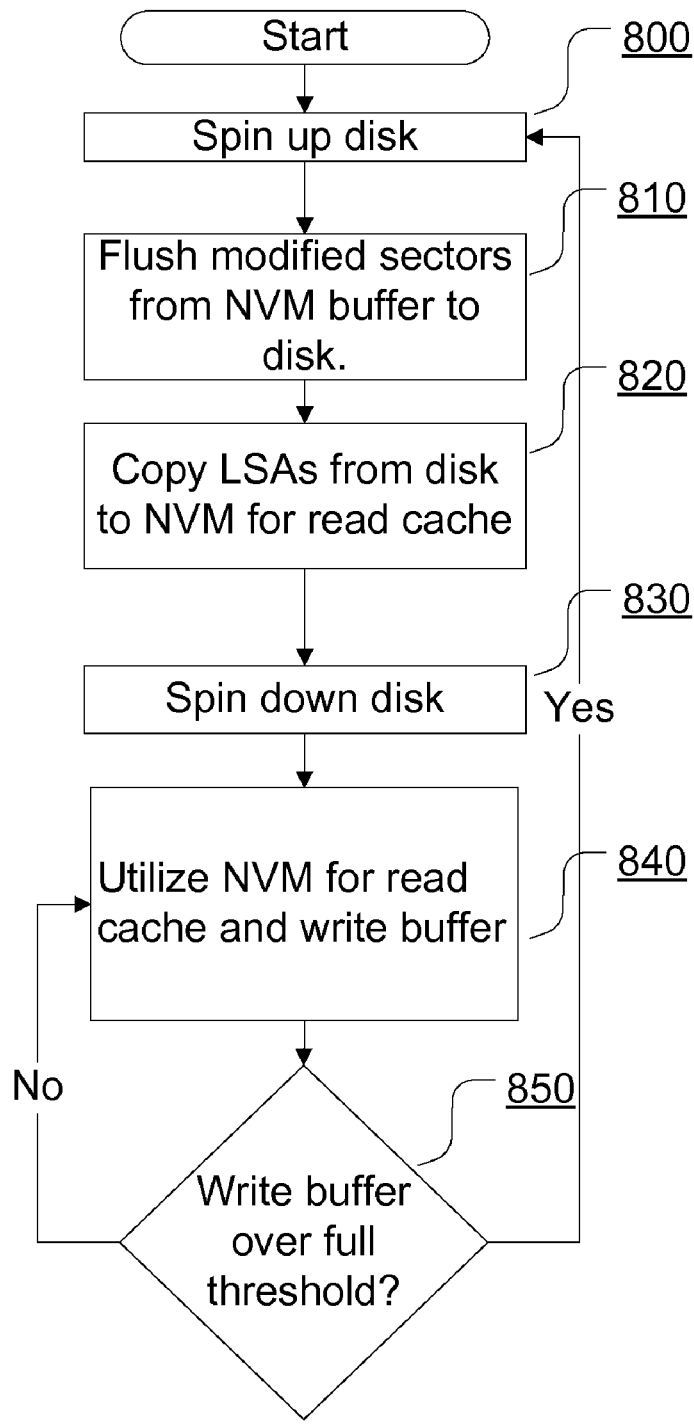
FIG. 8 is a flow diagram of the operations in the running state according to one embodiment of the invention.

After this state is complete, the running state 610 is entered, and the OS sends a command to flush and repopulate the cache with specified LSAs. The operations of the running state 610 are shown in FIG. 8. As shown in FIG. 8, in the running state, if the disk is not already spun up, the disk is spun up, step 800. In step 810, any modified sectors in the NV memory 200 are flushed to the disk/long-term storage medium 430. The LSAs specified by the OS are then read from the disk to the NV memory 200 for the read cache in step 820. The disk is then spun down, step 830. In step 840, the NV memory 200 is used as a read cache and a write buffer. Cached sectors are provided as requested; sectors written to are saved in the NV memory buffer, overwriting read cache sectors according to priority. When the write buffer is over the full threshold, step 850, the NV memory is flushed and repopulated, steps 800 through 830.

Figure 9:
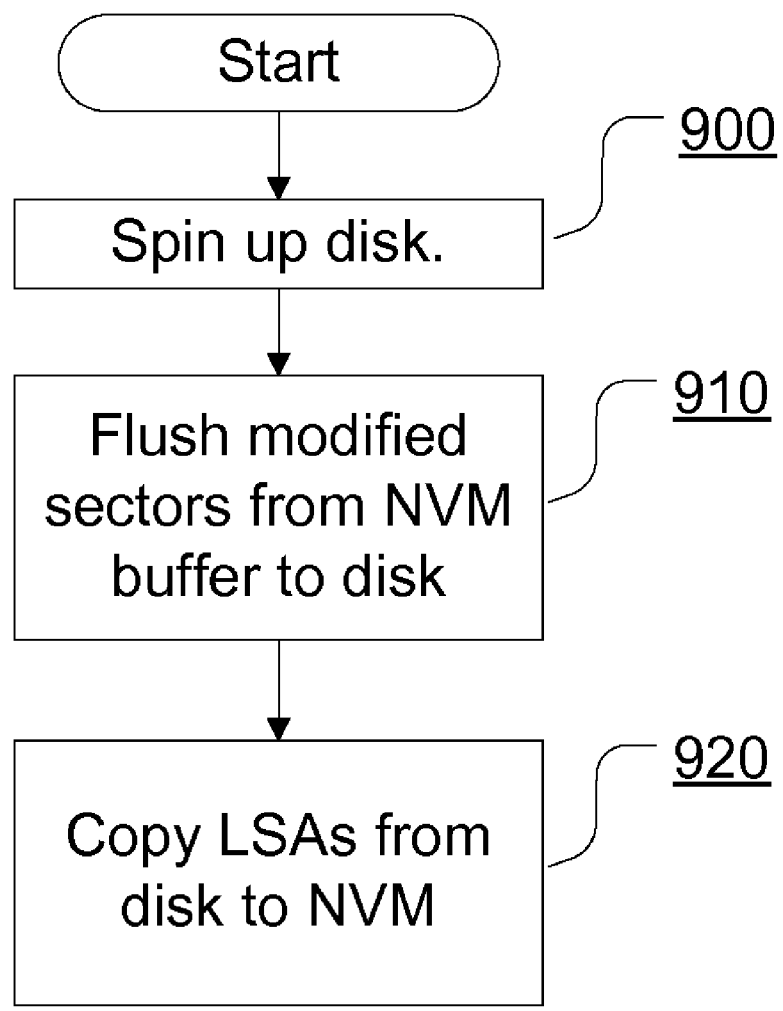
FIG. 9 is a flow diagram of the operations in the shut down state according to one embodiment of the invention.

When a command is received to shut down, the shut down state 620 is entered. The operations of the shut-down state 620 are shown in FIG. 9. The disk is spun up, step 900. In step 910, any modified sectors in the NV memory 200 are flushed to the disk/long-term storage medium 430. The LSAs specified by the OS are then read from the disk to the NV memory 200 for the read cache in step 920. This allows the NV memory to have data available which will be requested at startup by BIOS and the operating system 134.

Other forms of shut-down or analogous pauses in functioning (for example, stand by and hibernate) also function according to the methods shown in FIGS. 6 through 9. Information needed to resume functioning is stored in the NV memory 200, which allows quicker resumption.

Again, as described above, the OS 134 and applications (via the OS 134) may give other hints to the device controller 440 to help it determine when to spin up or spin down the disk, and conversely, if the controller FW must spin the disk up for any reason, it sends an interrupt to the OS 134 indicating the disk is spinning up. The operating system and applications can then take advantage of this situation to write non-critical data that has been cached in volatile working memory to the storage unit.

In one embodiment, the controller 440 firmware also utilizes the benefits realized from NV memory 200 to lower acoustic noise in hard drive storage units. By setting the write buffer threshold low enough, the controller 440 is able to spin up more slowly and take longer to flush the write buffer to the disk 430, reducing acoustic noise from the spindle and the heads to seek servos. This technique also reduces the peak current draw from the power supply. The controller 440 firmware also takes advantage of relatively large amounts of data in the buffer to place data on the disk in contiguous blocks and avoid fragmentation when flushing the data to disk.

The exact state of the cache 500 is known only by the controller 440. The operating system can get a snapshot of it by querying the controller 440. At any point in time the operating system 134 may choose to flush the cache 500 and start with a fresh set of sectors it believes will be required in the near future by sending a command (transition 613 in FIG. 6).

In one embodiment, in the absence of a specific command from the OS 134 to populate the cache portion 500 with files by presenting a list of LSAs (e.g. those required to boot or resume from hibernate on transition 615, or generally those given upon a transition from boot state 600 or in running state 610) the controller could do its own prefetching from disk to NV memory 200 by monitoring disk IOs immediately after boot or S4 resume. These IOs represent the most likely data to be required on the next boot or S4 resume. Once this data is collected by the controller 440 it is stored in a table in NV memory 200. On next shutdown or hibernate, the controller 440 uses this data to populate the NV memory 200 from disk before shutting down or hibernating.

Control of Mapped Portion 510

The operating system directly controls the mapped portion 510 of NV memory 200. For this portion, the operating system defines specific logical sector addresses that must map to the mapped portion 510. This gives the operating system direct control of the data stored in the NV memory 200. Such control, in one embodiment, may also be given to other applications.

One way in which this can be accomplished is where operating system 134 creates a portion of NV memory 200 that maps or shadows a specific but not necessarily contiguous set of LSAs. To create this portion the OS sends a command to the disk controller to flush the entire NV memory 200 which moves all modified data in the write buffer and in a previous mapping to the long-term storage medium 430. It then sends a command to map a list of LSAs to the mapped portion 510 of the NV memory 200. The controller 440 copies sectors from the disk to the NV memory 200 and maintains them there until told otherwise by the operating system 136. If the logical sector addresses sent to the persistent storage device 300 for mapping extend beyond the current address space of the disk 430 then these are appended to the end of the disk's address space. When a remapping occurs the OS 134 will need to copy the data in these extended addresses to locations in the disk's address space to avoid losing data. The operating system is in direct control of these mapped sectors in NV memory 200

Figure 10:
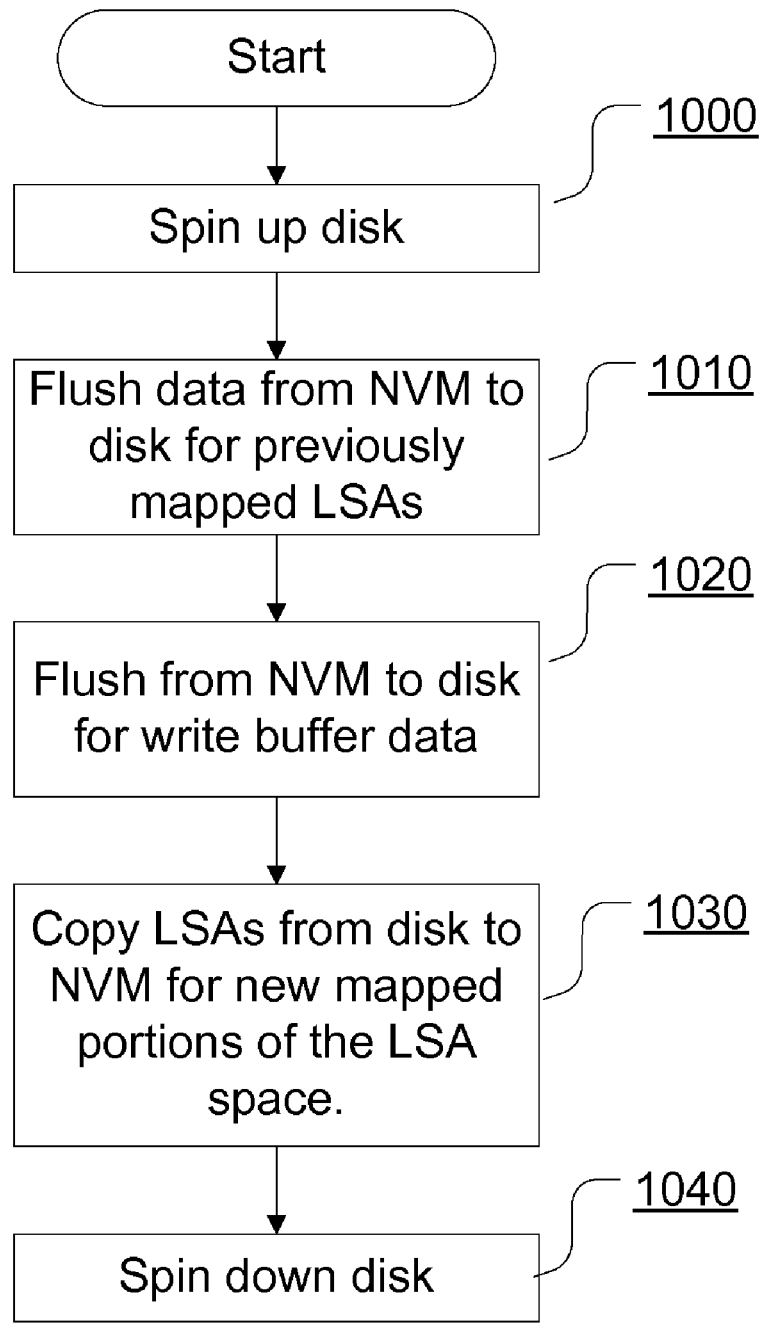
FIG. 10 is a flow diagram of the operations during a flush of the mapped portion of the non-volatile memory according to one embodiment of the invention.

The OS 134 may periodically flush the mapped portion 510 to disk 430 and map a new set of LSAs to the mapped portion 510. This occurs as shown in FIG. 10. In step 1000, the disk 430 is prepared for reading/writing. In step 1010, the data from the mapped portion 510 of the NV memory 200 is flushed to the disk 430. In step 1020, the cache portion 500 is also flushed to the disk. In step 1030, the new LSAs to be mapped are copied from the disk 430 to the mapped portion 510 of the NV memory 200. Although not shown, the cache portion 500 in one embodiment, is filled with data from the disk 430 in order to function as a read cache. The disk 430 is then spun down, step 1040.

As an alternative to this mapping, the NV memory may also be configured as a separate partition or logical volume of the persistent storage device 300. Continuous logical sectors are then under direct control of the operating system 136 as described above.

Self-Descriptive Memory Portion for the Persistent Storage Device 300

In addition to a cache portion 500 and a mapped portion 510 as shown in FIG. 5, in one embodiment, a portion of the NV memory is set aside to store certain information about the persistent storage device 300 which will allow diagnostics or other information to be maintained.

In one embodiment, such descriptive information includes label information, the number of bad sectors in the long-term storage medium 430, statistical data regarding the number of sectors written to or from in a certain amount of time, the number of spin ups or spin downs of the disk in a certain amount of time, and the number of hours the long-term storage medium has run.

In one embodiment, this self-descriptive memory portion is read by specific interfaces which allow OS components or an application to access the memory. In another embodiment, the persistent storage device 300 includes a display. For example, an LCD display may be included in the persistent storage device 300. When a certain query is made to the persistent storage device 300, either via the computer 110 or directly (e.g. by pressing a button on the persistent storage device 300), data from the self-descriptive memory portion is displayed.

In one embodiment, the OS or an application use the information stored in the self-descriptive memory to determine when the storage device 300 is nearing its life expectancy and the data stored on said storage device 300 needs to be transferred to a new storage device.

Information may also be stored which allows the NV memory 200 to be used as a "black box" recorder, which stores data concerning the operation of the computer. In case of a failure, such as an abnormal shut-down, information regarding the operation of the computer is stored and can be retrieved in order to analyze the failure. Such information may include process information regarding processes running in said computer system; thread information regarding threads running in said computer system; data accesses; and device accesses. Similarly to a black box recorder in an airplane, a limited amount of space may be allotted to this operational information, and when more information is collected than can fit in that space, previously-stored operational information is overwritten with newer information.

Wear Leveling

Certain NV memory technologies suffer from wear-out after too many erase cycles. In order to delay the onset of such wear-out, the controller 440, in one embodiment, balances the erasure of all areas of the NV memory 200 in order to ensure that approximately equal use is made of each area. The controller 440 changes the physical locations used within the NV memory to avoid wearing out NV memory blocks associated with disk sectors that are written to frequently. In one embodiment, this requires a certain amount of overhead to be used to guarantee that there is always space available in the mapped portion to do the wear leveling. For example, if 1 MB of sectors are set aside for mapped portion 510, the disk controller may actually set aside 1.5 MB to allow the wear leveling to work properly.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of operating a computer system having a non-volatile memory and a long-term storage medium, the method comprising:
   defining in the non-volatile memory, a mapped portion that is mapped to at least one logical sector address, the at least one logical sector address selected for use by an operating system to access said mapped portion in said non-volatile memory;
   using said at least one logical sector address for storing in said mapped portion, a first boot data that is used for initializing said computer system;
   utilizing said first boot data stored in said non-volatile memory to initialize said computer system; and
   defining in the non-volatile memory, a cache portion that is not under direct control of the operating system and is different than the mapped portion which is under exclusive and direct control of the operating system.

2. The method of claim 1, further comprising:
   receiving a request to transition said computer system to a shut-down state; and
   storing in said mapped portion of the non-volatile memory, a second boot data that is used for a subsequent initialization of said computer system.

3. A computer-readable storage medium having computer-executable instructions to perform the method of claim 1.

4. The method of claim 1, further comprising:
   populating the cache portion with specific sectors that are likely to be needed at the time of the next boot.

5. The method of claim 1, further comprising:
   populating the cache portion with specific sectors that are likely to be needed when the computer system resumes after hibernation.

6. The method of claim 1, wherein the long-term storage medium comprises a hard disk and wherein said first boot data stored in said mapped portion of the non-volatile memory permits said computer system to power up in a safe mode for diagnosing a mechanical failure of said hard disk.

7. A method of operating a computer system having a non-volatile memory and a long-term storage medium, comprising:
   storing operational data regarding the operations of said computer system in said non-volatile memory;
   using said operational data to analyze a failure in the long-term storage medium after an abnormal shutdown of said computer system; and
   defining in the non-volatile memory, a first portion that is not under direct control of an operating system of the computer system and is different than a second portion of the non-volatile memory which is under exclusive and direct control of the operating system.

8. The method of claim 7 wherein the operational data is stored in a third portion of the non-volatile memory that is different than the first and second portions of the non-volatile memory.

9. The method of claim 7 wherein the operational data is stored in the second portion of the non-volatile memory.

10. The method of claim 7, wherein the long-term storage medium is a mechanical disk, and the failure is a mechanical failure in the mechanical disk.

11. A computer-readable storage medium having computer-executable instructions to perform the method of claim 7.

12. A method of storing data in a computer system having a non-volatile memory and a long-term storage medium, the method comprising:
- storing a first version of data in said non-volatile memory;
- storing a second version of data in said non-volatile memory, wherein said second version is a copy of said first version;
- updating thereafter, said second version of data with at least one data change; and
- defining in the non-volatile memory, a first portion that is not under direct control of an operating system of the computer system and is different than a second portion of the non-volatile memory which is under exclusive and direct control of the operating system.

13. The method of claim 12, further comprising:
- providing an indication that said first version of data is a current version of data; and
- upon updating of said second version of data, changing said indication to indicate that said first version is an archived version of data.

14. A computer-readable storage medium having computer-executable instructions to perform the method of claim 12.

15. A computer system utilizing a non-volatile memory and a long-term storage medium, the system comprising:
- logic for defining in the non-volatile memory, a mapped portion that is mapped to at least one logical sector address, the at least one logical sector address selected for use by an operating system to access said mapped portion in said non-volatile memory;
- logic for using said at least one logical sector address for storing in said mapped portion, a first boot data that is used for initializing said computer system;
- logic for utilizing said first boot data stored in said non-volatile memory to initialize said computer system; and
- logic for defining in the non-volatile memory, a cache portion that is not under direct control of the operating system and is different than the mapped portion which is under exclusive and direct control of the operating system.

16. The computer system of claim 15, further comprising:
- logic for receiving a request to transition said computer system to a shut-down state; and
- logic for storing in said mapped portion of the non-volatile memory, a second boot data that is used for a subsequent initialization of said computer system.

17. The computer system of claim 16, where said storing second boot data comprises:
- logic for performing a preparatory action on said long-term storage medium to prepare said long-term storage medium for activity; and
- logic for writing other data from said non-volatile memory to said long-term storage medium.

18. A computer system utilizing a non-volatile memory and a long-term storage medium, the system comprising:
- logic for storing operational data regarding the operations of said computer system in said non-volatile memory;
- logic for using said operational data to analyze a failure in the long-term storage medium after a failure of said computer system; and
- logic for defining in the non-volatile memory, a first portion that is not under direct control of an operating system of the computer system and is different than a second portion of the non-volatile memory which is under exclusive and direct control of the operating system.

19. The computer system of claim 18, wherein the long-term storage medium is a mechanical disk, and the failure is a mechanical failure in the mechanical disk.

20. The method of claim 18 wherein the operational data is stored in the second portion of the non-volatile memory.

21. The method of claim 18 wherein the operational data is stored in a third portion of the non-volatile memory that is different than the first and second portions of the non-volatile memory.

22. A computer system utilizing a non-volatile memory and a long-term storage medium, comprising:
- logic for storing a first version of data in said non-volatile memory;
- logic for storing a second version of data in said non-volatile memory, wherein said second version is a copy of said first version;
- logic for updating thereafter, said second version of data with at least one data change; and
- logic for defining in the non-volatile memory, a first portion that is not under direct control of an operating system of the computer system and is different than a second portion of the non-volatile memory which is under exclusive and direct control of the operating system.

23. The computer system of claim 22, further comprising:
- logic for providing an indication that said first version of data is a current version of data; and
- logic for changing thereafter, said indication to indicate that said first version is an archived version of data.

* * * * *